US010572195B2

(12) United States Patent
Tan et al.

(10) Patent No.: US 10,572,195 B2
(45) Date of Patent: Feb. 25, 2020

(54) IMAGE FORMING SYSTEM AND METHOD THEREOF FOR PARSING INSTANT MESSAGING INFORMATION

(71) Applicant: Zhuhai Seine Technology CO., Ltd., Zhuhai (CN)

(72) Inventors: Xuan Tan, Zhuhai (CN); Wei Zhao, Zhuhai (CN)

(73) Assignee: ZHUHAI SEINE TECHNOLOGY CO., LTD., Zhuhai (CN)

( * ) Notice: Subject to any disclaimer, the term of this patent is extended or adjusted under 35 U.S.C. 154(b) by 0 days.

(21) Appl. No.: 15/879,342

(22) Filed: Jan. 24, 2018

(65) Prior Publication Data

US 2018/0210683 A1    Jul. 26, 2018

Related U.S. Application Data

(63) Continuation-in-part of application No. PCT/CN2016/081025, filed on May 4, 2016.

(30) Foreign Application Priority Data

Jul. 29, 2015  (CN) .......................... 2015 1 0458286

(51) Int. Cl.
*G06F 3/12* (2006.01)
*G06K 15/02* (2006.01)
(Continued)

(52) U.S. Cl.
CPC .......... *G06F 3/1206* (2013.01); *G06F 3/1228* (2013.01); *G06F 3/1247* (2013.01);
(Continued)

(58) Field of Classification Search
None
See application file for complete search history.

(56) References Cited

U.S. PATENT DOCUMENTS 5,790,793 A * 8/1998 Higley .................. G06F 16/955
709/218
6,778,289 B1 * 8/2004 Iwata .................... G06F 16/951
358/1.15
(Continued)

FOREIGN PATENT DOCUMENTS

CN    101114300 A    1/2008
CN    101807139 A    8/2010
(Continued)

*Primary Examiner* — Beniyam Menberu
(74) *Attorney, Agent, or Firm* — Anova Law Group, PLLC

(57) ABSTRACT

An image forming system and an image forming method for parsing instant messaging information are provided. The system includes a receiver for receiving instant messaging information, a parser for determining a data type of the instant messaging information, a processor for processing the instant messaging information based on the determined data type and converting the instant messaging information into image information recognizable and printable by the image forming device, and an imager for controlling the image forming device to print the image information. The processor includes an imbedded browser, and when the data type is website link, the embedded browser acquires related content corresponding to the link, the processor converts the related content into image information recognizable and printable by the image forming device. The image information is sent to the imager.

17 Claims, 6 Drawing Sheets

(51) Int. Cl.
*H04L 12/58* (2006.01)
*H04N 1/00* (2006.01)
*H04N 1/32* (2006.01)

(52) U.S. Cl.
CPC .......... *G06F 3/1285* (2013.01); *G06F 3/1292* (2013.01); *H04L 51/046* (2013.01); *H04L 51/066* (2013.01); *H04L 51/10* (2013.01); *H04N 1/00* (2013.01); *H04N 1/00217* (2013.01); *H04N 1/00233* (2013.01); *H04N 1/00244* (2013.01); *H04N 1/32021* (2013.01); *G06F 3/122* (2013.01); *G06F 3/1248* (2013.01); *G06F 3/1265* (2013.01); *H04N 2201/0039* (2013.01); *H04N 2201/0065* (2013.01)

(56) References Cited

U.S. PATENT DOCUMENTS

| | | | | |
|---|---|---|---|---|
| 8,112,103 | B2* | 2/2012 | Yeh | H04L 51/066 455/412.1 |
| 8,201,247 | B1* | 6/2012 | Chen | G06F 21/564 726/22 |
| 2003/0142801 | A1* | 7/2003 | Pecht | H04N 1/00127 379/100.01 |
| 2004/0252332 | A1* | 12/2004 | McCoog | H04M 1/7253 358/1.15 |
| 2005/0162685 | A1* | 7/2005 | Heiles | G06F 3/1206 358/1.15 |
| 2009/0190166 | A1* | 7/2009 | Nakamura | G06F 3/1219 358/1.15 |
| 2009/0265438 | A1* | 10/2009 | Podl | G06Q 10/107 709/206 |
| 2010/0210245 | A1* | 8/2010 | Kim | H04M 3/42382 455/412.1 |
| 2013/0217368 | A1* | 8/2013 | Kim | H04M 3/51 455/414.1 |
| 2013/0314214 | A1* | 11/2013 | Leica | H04W 4/80 340/10.1 |
| 2014/0095673 | A1* | 4/2014 | Mao | H04L 67/02 709/219 |
| 2014/0114793 | A1* | 4/2014 | Silver | G06Q 30/02 705/26.5 |
| 2014/0204419 | A1* | 7/2014 | Logue | G06F 3/1208 358/1.15 |
| 2014/0230023 | A1* | 8/2014 | Parks | G06F 21/41 726/4 |
| 2016/0049818 | A1* | 2/2016 | Yao | G06K 19/06037 320/103 |
| 2016/0328140 | A1* | 11/2016 | Zhang | H04L 51/04 |
| 2017/0317962 | A1* | 11/2017 | Chen | H04L 51/00 |

FOREIGN PATENT DOCUMENTS

| | | |
|---|---|---|
| CN | 102811183 A | 12/2012 |
| CN | 103186354 A | 7/2013 |
| CN | 103377011 A | 10/2013 |
| CN | 103944803 A | 7/2014 |
| CN | 105187684 A | 12/2015 |

* cited by examiner

IMAGE FORMING SYSTEM AND METHOD THEREOF FOR PARSING INSTANT MESSAGING INFORMATION

CROSS-REFERENCES TO RELATED APPLICATIONS

This application is a continuation-in-part of International Patent Application No. PCT/CN2016/081025, filed on May 4, 2016, which claims priority of Chinese Patent Application No. 201510458286.2, filed on Jul. 29, 2015, the entire contents of all of which are incorporated herein by reference.

FIELD OF THE DISCLOSURE

The present disclosure generally relates to the technical field of image formation and, more particularly, relates to an image forming system for parsing instant messaging information, and an image forming method thereof.

BACKGROUND

As a traditional device with high technical maturity, the image forming devices have been widely applied at the environment of offices and home. Further, as the smart communication devices are becoming more and more popular, many image forming devices are equipped with a wireless network module (e.g., a Wi-Fi functional module) for performing information exchange with the smart communication devices, such that the image forming devices may be more conveniently used by the user. However, similar to the traditional personal computers (PC), the smart devices in existing technologies need an individual driver software to drive the image forming devices to realize the printing function. Thus, before the first time the user uses the image forming device, an application program (APP) that can be connected to and drive the image forming device needs to be downloaded and installed. As a result, there are relatively high requirements on the memory and the processor of the smart device, and the operations of the user when using the smart device are relatively complicated. Thus, how to conveniently and rapidly print various types of exchange information has become technical issues to be solved by those skilled in the relevant art.

BRIEF SUMMARY OF THE DISCLOSURE

To solve the aforementioned technical issues, the present disclosure provides an image forming system and image forming method that can directly perform parsing and printing of instant messaging information on an image forming device.

One aspect of present disclosure provides an image forming system for parsing instant messaging information. The system includes:
 a receiver, configured to receive instant messaging information;
 a parser, configured to determine a data type of the instant messaging information;
 a processor, configured to, based on the determined data type, process the instant messaging information, and convert the instant messaging information into image information recognizable and printable by the image forming device; and
 an imager, configured to control the image forming device to print the image information.

For example, the parser may parse the instant messaging information to determine the data type of the instant messaging information, and the data parsed by the parser may include data of a first type, data of a second type, and data of a third type. The data of the first type refers to text and/or image, the data of the second type refers to website link, and the data of the third type refers to data in types other than text, image and website link. In other words, the data type may be text and/or image, website link, or types other than text, image, and website link.

According to embodiments of the present disclosure, when the data type is the text and/or image, the aforementioned processor may convert the text and/or image into image information recognizable and printable by the image forming device, and the obtained image information may be provided to the imager.

According to embodiments of the present disclosure, the aforementioned processor may include an embedded browser, and when the data type is the website link, the embedded browser may acquire related content corresponding to the link for conversion by the processor into image information recognizable and printable by the image forming device. The obtained image information may be provided to the imager.

According to embodiments of the present disclosure, the aforementioned image forming system may further include a safety detector, configured to determine whether the website link is safe or not.

According to embodiments of the present disclosure, the aforementioned image forming system may be distributed over a managing server and one or more image forming devices managed by the managing server. The managing server includes the receiver and the parser, and each image forming device may include the processor and the imager.

According to embodiments of the present disclosure, the aforementioned receiver may be an instant messaging client for login by a user. Through the instant messaging client, the user may select and/or configure the corresponding image forming device to complete a printing task.

According to embodiments of the present disclosure, the aforementioned instant messaging client may be a WeChat (an instant message application developed by Tencent) client, and the parser may, based on a Message Type value (MsgType value) in the data received by the WeChat client, determine the data type of the information received by the WeChat client.

According to embodiments of the present disclosure, the aforementioned information received by the WeChat client includes information shared through a function of WeChat named "Moments", and/or information pushed by a friend, and/or information shared by a WeChat user.

According to embodiments of the present disclosure, the aforementioned image forming system may further include a permission managing element configured to prevent malicious printing requests. The permission managing element may include a printing frequency configuration module, a printing type configuration module, a printing page number configuration module, and/or a user permission configuration module.

According to embodiments of the present disclosure, the aforementioned image forming system may further include a printing management element, configured to feed back information related to a printing task to the user.

Another aspect of the present disclosure provides an image forming method for parsing instant messaging information. The method includes:

receiving instant messaging information;

determining a data type of the instant messaging information;

based on the determined data type, acquiring content of data or acquiring content of a data link; and based on the acquired content of data or acquired content of the data link, printing image information.

According to embodiments of the present disclosure, when the data type is text and/or image, the instant messaging information may be directly converted to the image information recognizable and printable by the image forming device.

According to embodiments of the present disclosure, when the data type is website link, the related content corresponding to the website link is acquired and converted to image information recognizable and printable by the image forming device.

According to embodiments of the present disclosure, the instant messaging information may be information received by a WeChat client, and the data type of the information received by the WeChat client may be determined based on a Message Type value (MsgType value) in data received by the WeChat client.

Other features and advantages of the present disclosure will be illustrated hereinafter in the succeeding specification, and will become apparent from the specification partially, or may be understood by implementing the present disclosure. The objectives and other advantages of the present disclosure may be realized and obtained from structures particularly pointed out in the specification, appended claims, and accompanying drawings.

BRIEF SUMMARY OF THE DRAWINGS

The accompanying drawings are provided for further understanding of the present disclosure and thus form a part of the specification. Together with embodiments of the present disclosure, the accompanying drawings are used to illustrate the present disclosure, which form no limitation of the present disclosure. In the accompanying drawings.

DETAILED DESCRIPTION

To make the above objectives, technical solutions, and advantages of the present disclosure more apparent, the present disclosure will be illustrated in details hereinafter with reference to the accompanying drawings and specific implementations.

It should be noted that, according to the image-forming function, the image forming device disclosed in the present disclosure may include, but is not limited to, devices such as a printer, a copier, and an all-in-one printer. Based on the way images are formed, the image forming device may include, but is not limited to, devices such as an LED image forming device, a laser image forming device, and an inkjet imaging device.

The instant messaging information disclosed in the present disclosure may include, but is not limited to, information sent or received by software programs such as QQ or Wechat offered by Tencent Technology Co Ltd., MSN offered by the Microsoft Corporation, ICQ offered by the AOL Inc., Wangwang offered by Taobao, POPO offered by NetEase, Inc., Mi Talk offered by Xiaomi Inc., Fetion offered by China Mobile, etc.

Figure 1:
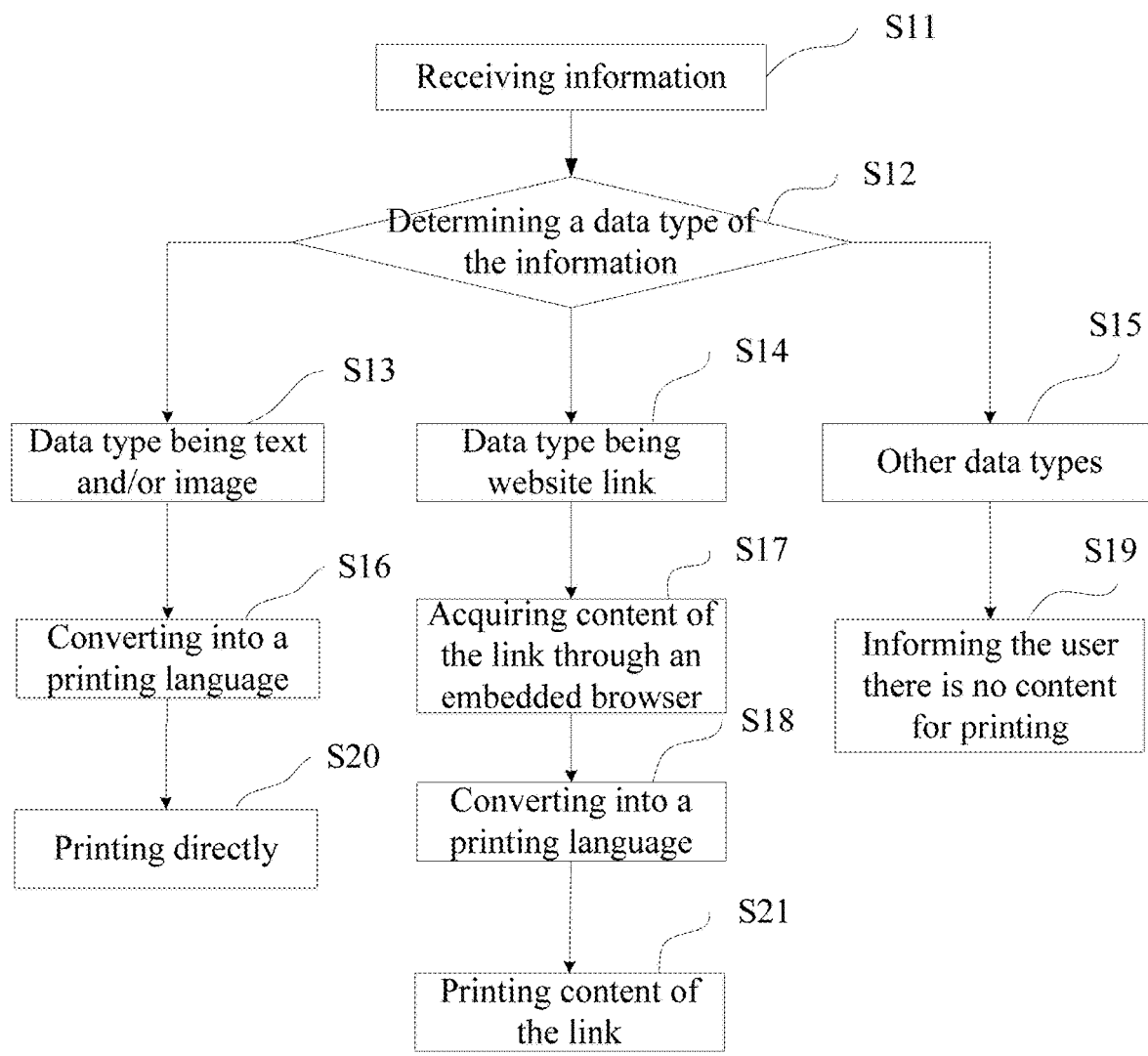
FIG. 1 illustrates a working flow chart of an exemplary image forming method for parsing instant messaging information provided by embodiments of the present disclosure.

FIG. 1 illustrates a working flow chart of an exemplary image forming method for parsing instant messaging information provided by embodiments of the present disclosure. As shown in FIG. 1, an image forming method for parsing instant messaging information is provided, and the method includes following exemplary steps.

At S11, to-be-printed external data information is received by an instant messaging software program of an image forming device.

At S12, data type of the information received by the instant messaging software program is determined.

At S13, when the data type determined at S12 corresponds to a data type of text and/or image, step S16 is executed.

At S14, when the data type determined at S12 corresponds to a data type of website link, step S17 is executed.

At S15, when the data type determined at S12 corresponds to a data type other than text, image and website link, step S19 is executed.

At S16, the received text and/or image is converted into a language format recognizable and printable by the image forming device, such as a printer.

At S17, through an embedded browser, content of the link is acquired, and through an embedded Http client of the image forming device, content corresponding to the website link is parsed. Further, step S18 may be executed.

The Http client herein may sometimes be referred to as "client", and may be applied to provide a high-efficient, latest, and function-rich client programming kit that supports the Http protocol. The Http client may also support the latest version of the Http protocol and related suggestions.

It should be noted that the embedded browser mentioned in the present disclosure may be a module having functions similar to a browser that is embedded in the image forming device. For example, when parsing data having a data type of website link, through an online surfing functional module of the embedded browser that is similar to a browser, a corresponding website link may be accessed, which prepares for subsequent acquisition of specific content on a webpage.

At S18, the specific content corresponding to the website link at S17 is converted into a language format recognizable and printable by the image forming device.

At S19, the user is informed that no content is available for printing, or the printing content cannot be recognized.

At S20, direct printing is performed. When the information is in a format of pure text, a Page Descriptional Language (PDL) module of the image forming device may be utilized to print out the information in the format of pure text. When the information is in an image format, when the PDL module in the image forming device supports printing of information in the image format, direct printing may be performed; otherwise, the information in the image format may be converted into PDF format for printing by the PDL module. However, in practical use, the present disclosure is not limited thereto, and the information in the image format may be converted into any other recognizable and printable language formats based on other modules embedded in the image forming device, such as a Printer Command Language (PCL) module or a Graphics Device Interface (GDI) language module.

At S21, the specific content acquired at Step 18 based on the website link is printed. More specifically, the content corresponding to the link may be converted into the image format or the PDF format for sending to the PDL module of the image forming device, and the image forming and printing step may then be executed.

In practical implementation, the data type determined at S12 may correspond to a data type including text, image, and/or website link. That is, in some embodiments, the data type determined at S12 may include a data type of text and a data type of website link. In some embodiments, the data type determined at S12 may include a data type of image and a data type of website link. In some other embodiments, the data type determined at S12 may include a data type of text, a data type of image, and a data type of website link.

Hereinafter, situations in which the data type determined at S12 includes a data type of text and a data type of website link are illustrated in details. Given the information received by the instant messaging software at S12 being "the material you need can be found at https://www.zhihu.com/compatibility/index.html" or similar variations as examples, the data type determined at S12 may include a data type of text and a data type of website link.

In one embodiment, for data corresponding to a data type of text (e.g., "the material you need can be found at"), the data is converted into the language format recognizable and printable by the image forming device (S16). For data corresponding to a data type of website link (e.g., "https://www.zhihu.com/compatibility/index.html"), an embedded browser is used to obtain the content corresponding to the website link (e.g., the website page opened by the embedded browser using the website link), and instead of the website link, the content corresponding to the website link is converted into the language format recognizable and printable by the image forming device (S17).

In another embodiment, the user may be notified to choose whether to print the website link directly, or print the content corresponding to the website link. If the user selects to print the website link, both the data corresponding to the data type of text (e.g., "the material you need can be found at") and the data corresponding to the data type of the website link (e.g., "https://www.zhihu.com/compatibility/index.html") are converted into the language format recognizable and printable by the image forming device. If the user selects to print the content corresponding to the website link, the data corresponding to the data type of the text is converted into the language format recognizable and printable by the image forming device; and the content corresponding to the website link is obtained through an embedded browser and is further converted into the language format recognizable and printable by the image forming device.

In another embodiment, when analyzing the data type of the information received by the instant message software, whether the information received by the instant message software includes a pre-configured user command is determined, and processing of the received information may be performed based on the user command. The user command may be, for example, "print directly" or "open the website link and print".

For example, the information received by the instant message software may be "the material you need can be found at https://www.zhihu.com/compatibility/index.html, print directly". Under this situation, the user command "printed directly" may be detected, and may be deleted from the information after being detected. Correspondingly, the website link may be treated as text for printing. That is, both the text "the material you need can be found at" and the website link "https://www.zhihu.com/compatibility/index.html" are converted into the language format recognizable and printable by the image forming device.

As another example, the information received by the instant message software may be "the material you need can be found at https://www.zhihu.com/compatibility/index.html, open the link and print". Under this situation, the user command "open the link and print" may be detected, and may be deleted from the information after being detected. Further, an embedded browser may be used to open the website link and acquire the content corresponding to the website link (e.g., webpage corresponding to the website link). Thus, "the material you need can be found at" and the content corresponding to the website link "https://www.zhihu.com/compatibility/index.html" are converted into the language format recognizable and printable by the image forming device.

Further, for situations in which the data type determined at S12 includes a data type of image and a data type of website link, or for situations in which the data type determined at S12 may include a data type of text, a data type of image, and a data type of website link, approaches the same as or similar to the above descriptions may be applied. Thus, repeated illustrations are not provided herein.

Figure 2:
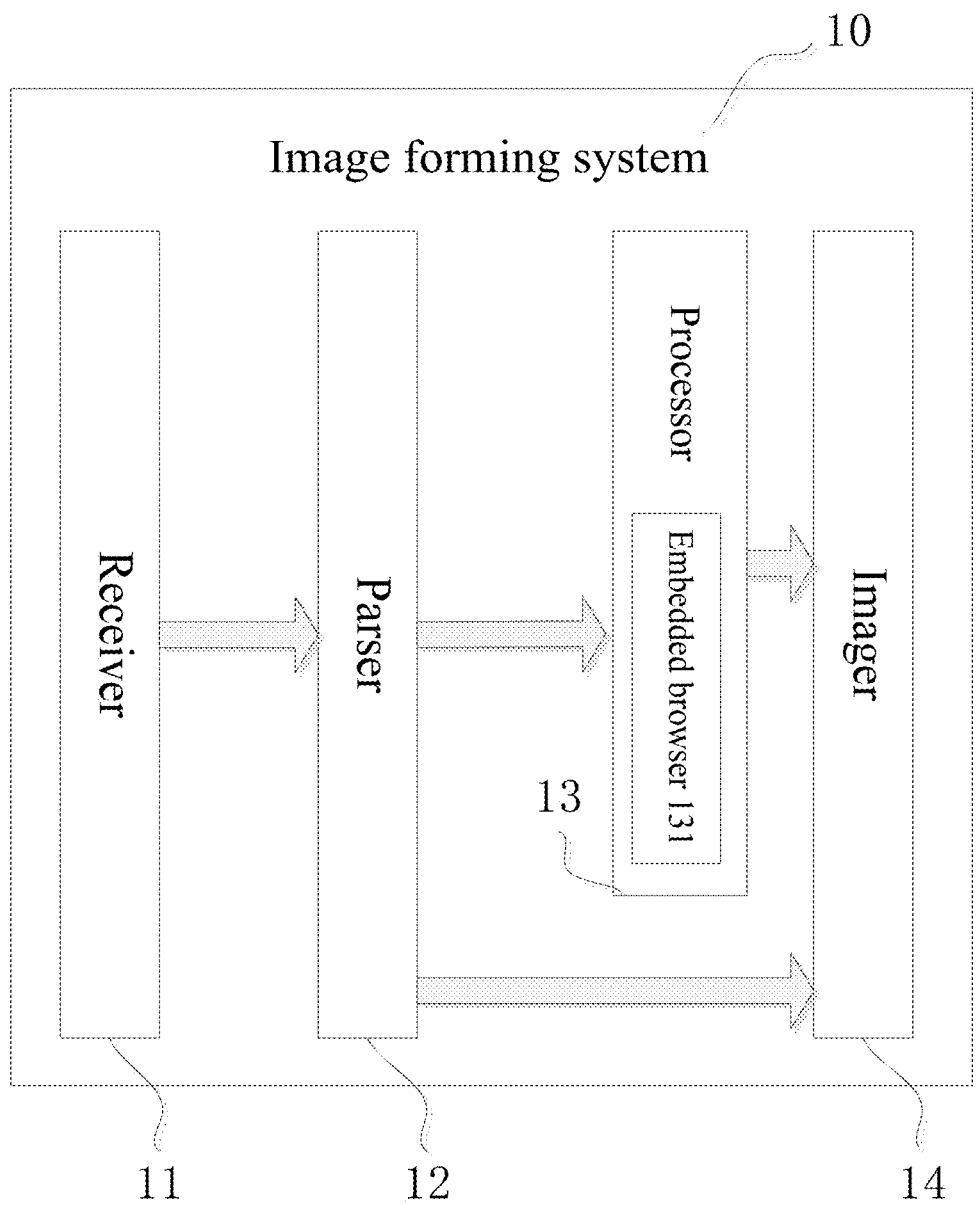
FIG. 2 illustrates a schematic view of an exemplary image forming system for parsing instant messaging information provided by embodiments of the present disclosure.

Correspondingly, FIG. 2 illustrates a schematic view of an image forming system for parsing instant messaging information provided by embodiments of the present disclosure. As shown in FIG. 2, an image forming system 10 is provided. The image forming system 10, or an image forming apparatus, may include: a receiver 11, a parser 12, a processor 13, and an imager 14. In one embodiment, the imager 14 may be disposed within an image forming device such as a printer, a copier, or an all-in-one printer. Further, based on functions, the image forming device may be an LED image forming device, a laser image forming device, or an inkjet imaging device, etc.

For example, the receiver 11 may be configured to receive instant messaging information. The parser 12 may be configured to determine a data type of the instant messaging information. The processor 13 may be configured to, based on the determined data type, process the instant messaging information to convert the instant messaging information into image information recognizable and printable by the image forming device. The imager 14 may be configured to control the image forming device to print the image information.

More specifically, the information parsed by the parser 12 may include a type of data received by the receiver 11. The data in the present disclosure may include data of a first type, data of a second type, and data of a third type. The data of the first type may be text and/or image, the data of the second type may be website link, and the data of the third type may be data in types other than text, image and website link.

The receiver 11 may be a login client of an instant messaging software program configured in the image forming device or an instant messaging software program logged in through a website login version. The processor 13 may include an embedded browser 131. On one hand, the instant messaging software program may be logged in through the embedded browser 131, and on the other hand, content corresponding to the website link may be acquired through the embedded browser 131. The imager 14 may recognize the image forming information sent by the parser 12 and/or the embedded browser 131, and enable the imager 14 of the image forming device to form images. The imager 14 may be, for example, a PDL module (not shown in the figure).

Accordingly, in the aforementioned technical solutions provided by the present disclosure, the processor of the image forming system may process data information in various types. For example, content corresponding to the website link may be acquired through the embedded browser to fulfill the corresponding printing task, thereby realizing diversification of printing functions of the image forming device. Further, when the parser determines that the data information is website link, the related content of the website link may be acquired through the embedded browser, such that the related printing task is fulfilled, which facilitates operations by users that frequently use the smart devices, thereby better satisfying the user requirements.

Figure 3:
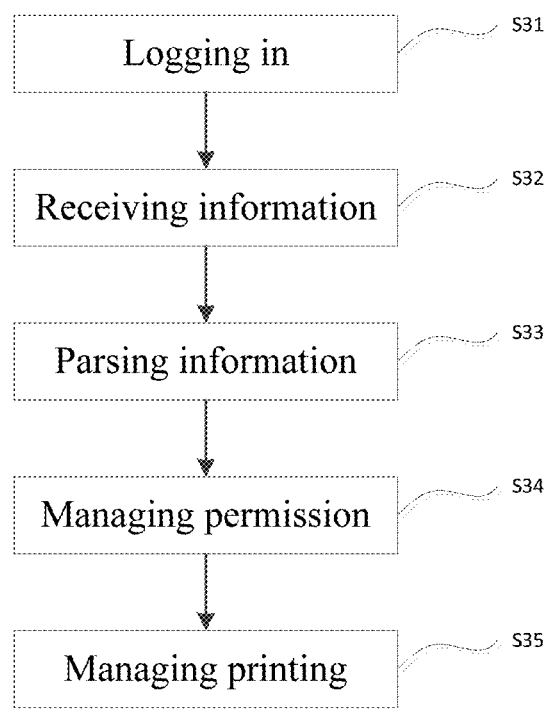
FIG. 3 illustrates a working flow chart showing printing of WeChat information according to embodiments of the present disclosure.

Hereinafter, implementations of the present disclosure are illustrated in details given WeChat as an example. FIG. 3 illustrates a working flow chart showing printing of WeChat information according to embodiments of the present disclosure. As shown in FIG. 3, printing of Wechat information may include logging in Wechat (S31), receiving information (S32), parsing information (S33), managing permission (S34) and managing printing (S35). More specifically, two exemplary approaches may be used to log into WeChat of the image forming device and include, for example: 1. login using ID and password; 2. login using a quick response (QR) code or a two-dimensional (2D) barcode.

In one exemplary approach, when an image forming device is made and leaves the factory, a WeChat account may have already been set up in the image forming device, or an interface may be provided to the user to set up a WeChat account in the image forming device. Such two situations both require the user to realize a client of WeChat inside the image forming device. When logging in the WeChat account, the user needs to input corresponding "WeChat ID" and "WeChat login password", which may be realized by an embedded Web server of the image forming device and/or a control panel of the image forming device.

Figure 4:
FIG. 4 illustrates a schematic view of a WeChat QR code formed in one embodiment of the present disclosure.

In another exemplary approach, the logging in of WeChat is implemented through an interface of Web WeChat (i.e., a web-version WeChat). A browser may be embedded in the image forming device, and when the user needs to use the image forming device to form images, a client of the WeChat may be started through a user interface (UI), where the UI may include but not limited to a webpage or a panel, etc., embedded in the image forming device. After the client of WeChat is started, the interface of the Web WeChat may be used to acquire a QR code (also called two-dimensional barcode) needed for login, and the QR code may be displayed on the UI or may be printed out directly (as shown in FIG. 4). The user may log in WeChat by scanning the QR code, and within a certain succeeding period of time, the image forming device may (synchronously) receive all information under the WeChat account of the user. Further, the user may parse certain information for subsequent printing.

Figure 5:
FIG. 5 illustrates a schematic view showing login of WeChat on an image forming device provided by embodiments of the present disclosure.

FIG. 5 illustrates a schematic view showing login of WeChat on an image forming device provided by embodiments of the present disclosure. As shown in FIG. 5, after the user scans the QR code through a self-owned smart device (including but not limited to cellphone, IPAD, etc.), the smart device may need user confirmation or permission for login. Optionally, an audio piece may be played in response to the user login being confirmed, and the user may move a knob of a process bar shown on a login page of WeChat to adjust the volume of the audio piece. Optionally, the user may also choose to cancel login.

After confirmation or permission, the embedded browser of the image forming device may acquire information received by the WeChat of the user. Further, the user may manage login permission and further manage related printing tasks.

As the technology of the QR code becomes more and more mature, an increasing number of instant messaging software programs now supports account login through the QR code. For example, other than the aforementioned WeChat account, instant messaging software programs including QQ offered by the Tencent Technology Co Ltd., and Wangwang offered by the Taobao also support logging in through QR code. Thus, same or similar login methods for the WeChat may be used for any other suitable instant messaging software programs.

The present disclosure may provide technical solutions having at least the following advantages.

In one example, the image forming device may be configured with a client that starts and logs in an instant messaging software program, and the instant messaging software program may support a login method of QR code scanning. The user may use a smart device to scan the QR code generated by the image forming device (e.g., the QR code is displayed through a display screen of the image forming device or the QR code is displayed by being printed on paper), and confirm log in to the instant messaging account on the image forming device. Further, the instant messaging information may be received through the instant messaging account. Thus, the user may directly scan and log in to the instant messaging account on the image forming device, and send the to-be-printed data to the account directly without passing through a third-party server other than the instant messaging server and the to-be-printed data does not need to be forwarded to accounts of other users or devices, which may better protect the privacy of the user.

In another example, current instant messaging login commonly supports the user(s) to log in at any time by scanning the QR code. For example, a plurality of users may respectively log in the image forming device by scanning a QR code. Such users may respectively send data needs to be printed to the image forming device through a corresponding account, such that the image forming device may better serve more users. Further, by configuring the embedded browser and/or the client of the instant messaging software program, the plurality of users may log in a same image forming device simultaneously, which facilitates the image forming device to realize the sharing service.

In yet another example, the smart device becomes popularized, the instant messaging software program becomes very common, and nearly all smart devices may be installed with one or more instant messaging software programs. Such image forming device supports login of corresponding instant messaging software program(s), and realizes printing of various types of data (e.g., document, image, webpage, etc.) without using particular image forming application (APP). Accordingly, the operations of the user become more convenient.

More specifically, the user may send the data needs to be printed to the WeChat account of the image forming device using methods of directly sending or sharing through the WeChat account of the smart device. Such image forming device may acquire the real-time interaction information of the user by embedding js script into an embedded Web browser. Optionally, WeChat further provides interfaces of sharing links of other application programs. Thus, the new or Office materials, etc., came across by the user at the smart device may also be shared to the WeChat account at the image forming device through the WeChat account of the smart device. Accordingly, the printing task of the news and Office materials may be directly realized.

Further, the user may send or share the to-be-shared content (data that needs to be printed) to the WeChat account of the image forming device through the method of QR code. The WeChat account at the image forming device may parse the received QR code, and execute different operations based on different data types parsed from the QR code.

As described previously, after the image forming device receives the data sent or shared by the outside, the data needs to be parsed. The information type acceptable by WeChat is the information sent to the Web browser in the Json (Java Script Object Notation) format. Thus, the parser needs to parse the Json data to determine the actual type of the data, i.e., image, word, link, or other types. Determination of the type of Json data may be realized by looking for word segments representing actual data type in the Json data: the Message Type value (MsgType value). A part of the correspondence relationships between the MsgType values and the actual data types are shown in Table 1.

TABLE 1

| Message type value (MsgType) | Types that the message belongs to |
| --- | --- |
| 1 | word |
| 3 | image |
| 34 | audio |
| 47 | ID |
| 49 | link |
| 62 | video |

Figure 6:
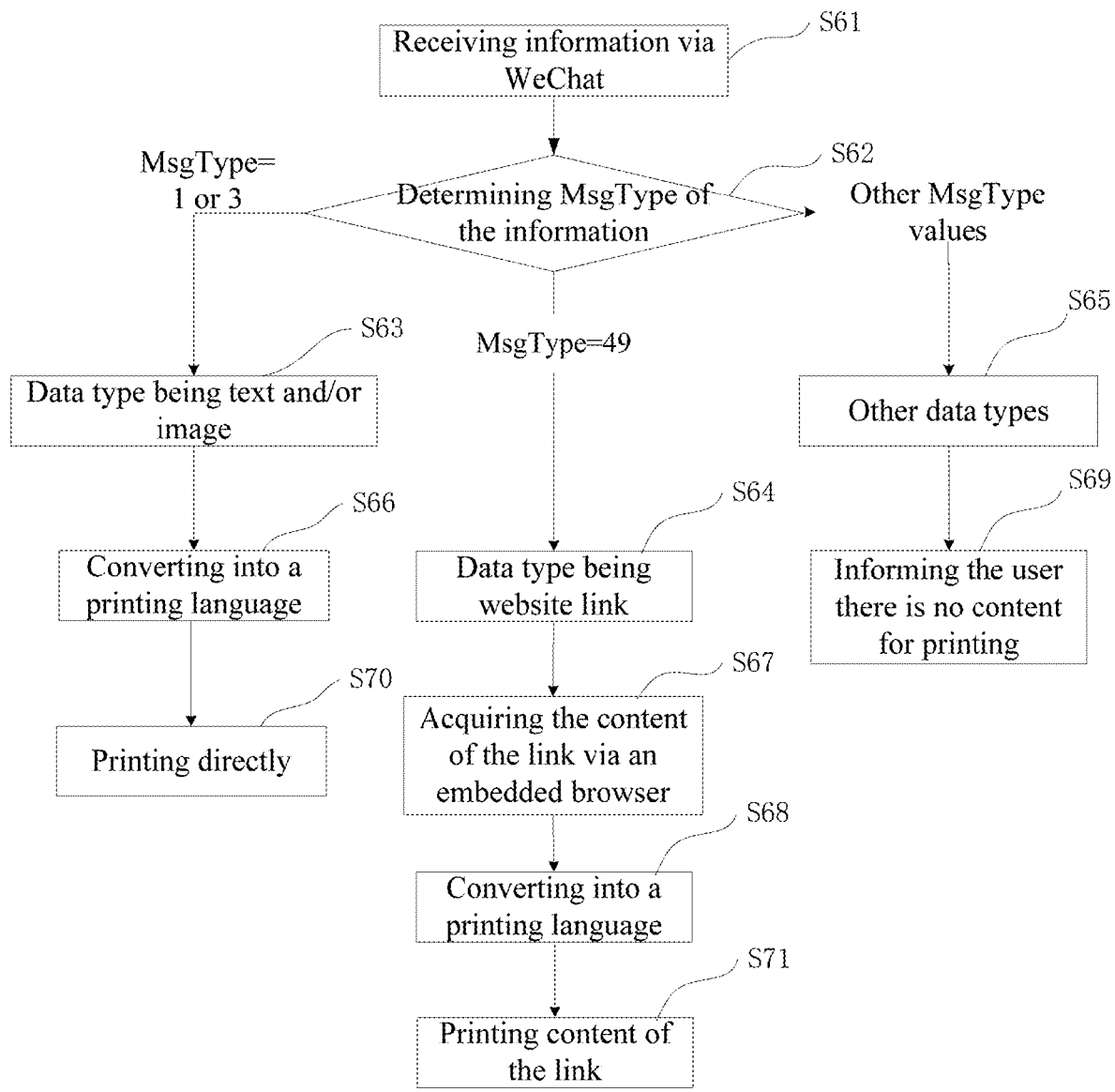
FIG. 6 illustrates a flow chart of an exemplary image forming method based on parsing of printing information transmitted by WeChat provided by embodiments of the present disclosure.

FIG. 6 illustrates a flow chart of an exemplary image forming method based on parsing of printing information transmitted by WeChat provided by embodiments of the present disclosure. As shown in FIG. 6, the specific method for the parser to parse information includes the following.

At S61, to-be-printed data information from outside is received by Wechat in an image forming device.

At S62, data type of the to-be-printed data information is determined.

At S63, when the MsgType at step S62 is equal to 1 or 3, the parsed data corresponds to a data type of text or image and S66 is executed.

At S64, when the MsgType at step S62 is equal to 49, the parsed data corresponds to a data type of website link and S67 is executed.

At S65, when the data parsed at S62 is not text, image or website link (MsgType is values other than 1, 3, and 49), S69 is executed.

At S66, the received text and/or image is converted into a language format recognizable and printable by the image forming device.

At S67, content of the link is acquired through the embedded browser, and content corresponding to the link is parsed through the embedded Http client in the image forming device, and S68 is executed.

At S68, specific content corresponding to the website link at S67 is converted into a language format recognizable by the image forming device.

At S69, the user is informed that no content is available for printing, or printing content cannot be recognized.

At S70, printing is performed. The condition of MsgType=1 corresponds to information in the pure text format, and the PDL module of the image forming device may print out the information in the format of pure text directly. The condition of MsgType=3 corresponds to information in the image format, and when the PDL module in the image forming device supports printing of information in the image format, direct printing may be performed; otherwise, the information in the image format may be converted into a PDF format for printing by the PDL module.

At S71, the content of the link is acquired at the printing step S68. The content corresponding to the link may be converted into the image format or the PDF format and be sent to the PDL module of the image forming device, and the image forming and printing step may be executed.

Optionally, after S63 or S67, a parameter pre-processing operation may be introduced. The image forming system or the image forming device may be configured with a parameter pre-processor, and the data information may be processed based on pre-configured paper size, such as A4 paper, A5 paper, and Letter paper, etc. Or, personalized front cover, back cover, or watermark, etc., may be configured. The image forming system or image forming device may further include an image pixel processor (similar to image processing software in the mobile smart device). The parameter pre-processor may call the image pixel processor to perform secondary processing such as brightness adjustment and font adjustment of the data information. Accordingly, the user may print more documents or images with richer content and better visual effects.

Based on the aforementioned descriptions, the disclosed image forming system may be further improved. A permission managing element (not shown) configured for preventing malicious printing requests may be introduced. The permission managing element may at least include a printing frequency configuration module, a printing type configuration module, a printing page number configuration module, and/or one or more functional modules in the user permission configuration module. The following functions may be realized by such modules.

1) Configuration of the Printing Frequency (Intervals Allowed Between Printings)

A configuration method is provided to the image forming device (embedded webpage or panel), such that the configuration of printing frequency of the WeChat user is realized. For example, the interval between two operations of printing may be at least 1 minute. When a WeChat printing request is received, the image forming device determines whether the time interval between the last printing and the current printing falls within the range allowed by the printing frequency. When the time interval is not within the allowed range (e.g., 1 min), the message such as "printing too frequently" may be sent to the user via WeChat information.

2) Configuration of the Printing Type

The image forming device provides a filtering function of the types of the printing information. For example, the image forming device may be configured to only print images, or words, or words less than 500, etc.

3) Configuration of the Number of Printing Pages

That is, the maximum page number allowed for each printing may be configured.

4) Configuration of User Permission

For example, the owner of the image forming device may be permitted for printing, and other people may be prevented from printing. After the function of "printing by the owner" is started, when the image forming device receives information, whether the source of the information is the WeChat user associated with (association occurs during the login process) the image forming device is determined. When the information is not sent by the owner of the image forming device, printing is not allowed.

Further, a blacklist may be configured, and people included in the blacklist may not be allowed for printing. A blacklist is configured in the image forming device, and when people in the list send messages to the image forming device, no response is generated.

Alternatively, a whitelist may be configured, and only people in the whitelist are allowed for printing. By configuring a whitelist in the image forming device, only when people in the whitelist send messages to the image forming device, response to printing request(s) is provided.

Further, based on the aforementioned descriptions, the disclosed image forming system may be additionally improved, and a printing management element (not shown in the figure) is introduced. Through the printing management element, a status feedback function may be started, which allows the image forming device to reflect the printing status by sending a WeChat message.

Optionally, the image forming system may further include a safety detector, configured to determine whether the website link is safe. For example, when the user receives a website link (i.e., data in the second type) from sharing in "Moments" (a WeChat function), the image forming device may determine whether the website link belongs to a safe link (e.g., via an external safety link database) through a filtering rule (e.g., via keywords the user configures at the image forming device). The image forming device may further inform the user whether the link is safe or the link satisfies the filtering rule through the way of warning.

Specifically, whether the link is safe can be determined through a safety website monitoring interface provided by a third party. For example, the Application programming interface (API) provided by an open platform of the professional anti-virus software website (e.g., the 360 website) may be used to search whether the link is safe. The open platform of the anti-virus software website may determine the hazard level of the link (safe, warning, serious warning, high risk, unknown, etc.). The image forming device may acquire the safety of the link through the open platform and notify the user whether the visit should be continued or not when non-safety link is detected.

Thus, the WeChat user no longer needs to download and install the application software specifically configured to drive the image forming device for the smart communication device, and synchronous transmission of the information may be fulfilled by logging in the client conveniently. Operations regarding the configuration of the image forming device may become easier and more convenient. Further, by parsing the Messaging Type value (MsgType value) in the messages delivered through WeChat, the data type to be printed by the WeChat user may be rapidly acquired, and the printing of various types of data information may be fulfilled. Further, the WeChat user may directly print the data content in the webpage through information push-up or the sharing function of the WeChat.

Figure 7:
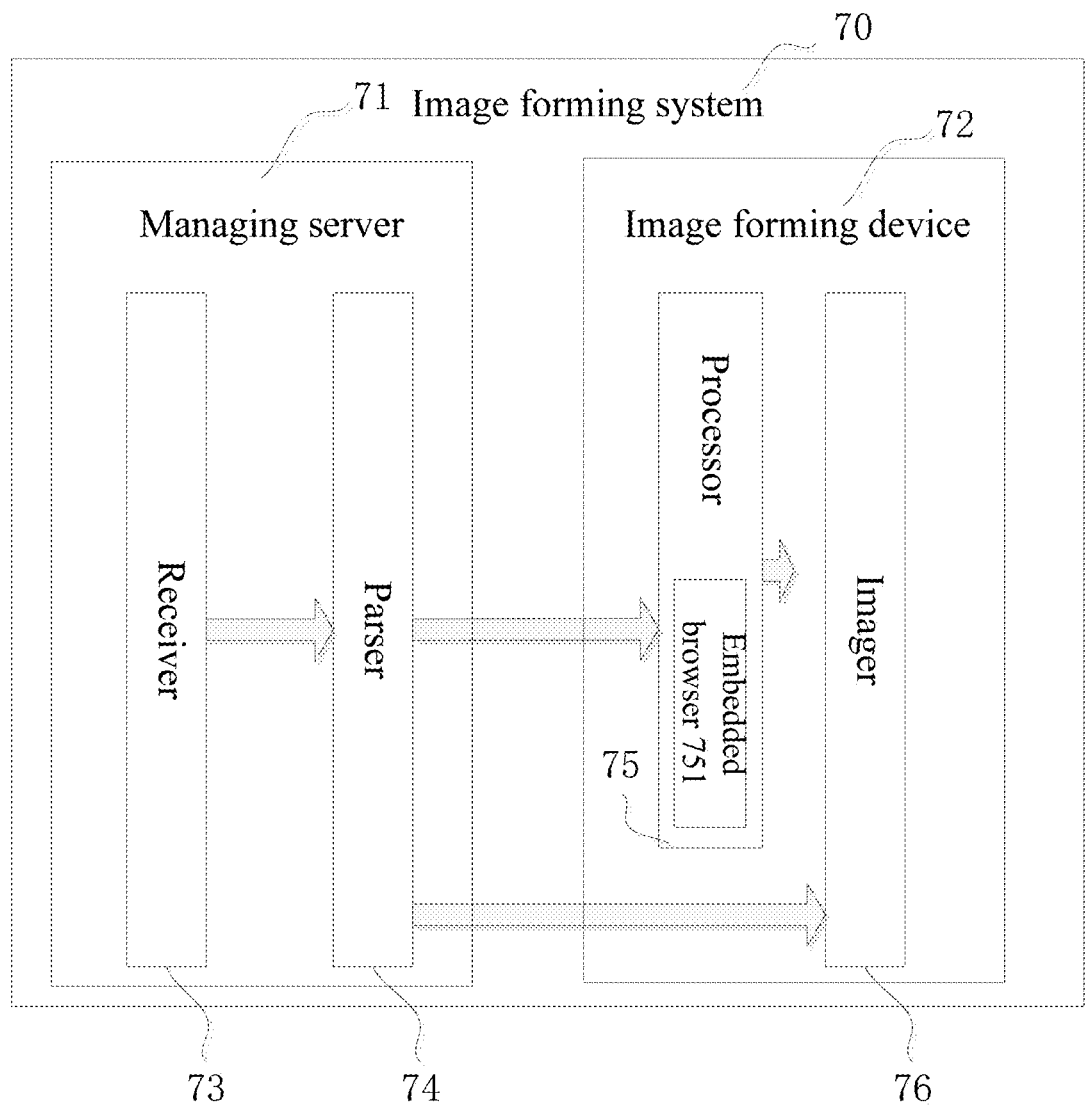
FIG. 7 illustrates a schematic view of an exemplary image forming system distributed over a managing server and an image forming device provided by embodiments of the present disclosure.

FIG. 7 illustrates a schematic view of an exemplary image forming system distributed over a managing server and an image forming device provided by embodiments of the present disclosure. As shown in FIG. 7, in one embodiment, the image forming system 70 may be distributed over a managing server 71 and an image forming device 72 managed by the managing server 71. Optionally, the managing server 71 may include a receiver 73 and a parser 74. The image forming device 72 may include a processor 75 and an imager 76. Optionally, the processor 75 may further include an embedded browser 751.

In FIG. 7, only the image forming device 72 is displayed. However, the number of image forming devices managed by the managing server may be one or more. When the number of image forming devices is more than one, the managing server may recommend one of the plurality of image forming devices under management that is physically closest to the user via a display interface of the mobile terminal, and remind the user to choose the closest image forming device. Optionally, each image forming device may include a processor and an imager.

Further, optionally, the managing server may display performance parameters of the plurality of image forming devices at the smart terminal, thereby facilitating the user to perform selection based on usage preference. Accordingly, the hardware resources may be properly allocated, and the friendly experience of the user may be improved.

As such, the user may log in the instant messaging client (e.g., an official account of WeChat) at the managing server 71, and the managing server 71 may fulfill the receiving and parsing of the data. The parsed data may be sent to the embedded browser 751 in the corresponding image forming device 72, and the embedded browser 751 may send the parsed data (e.g., content related to the website link) to the imager 76 to form an image. Or, after the managing server 71 fulfills data parsing, the data may be directly sent to the imager 76 in the corresponding image forming device 72 to form an image.

The advantages of such solution lies in that the plurality of image forming devices may be integrated, and a desired image forming device may be selected based on the user demand. Accordingly, the hardware resources may be properly allocated, and the friendly experience of the user may be improved.

With respect to existing technologies, various embodiments of the present disclosure can provide the following exemplary advantages:

1. The processor provided by the disclosed image forming system may process various types of data information, thereby realizing the diversification of printing functions of the image forming device;
2. When the parser determines that the data information is the website link, related content of the website link is acquired through the embedded browser to complete related printing tasks, which is more practical for users that frequently use the smart devices, thereby better satisfying the user requirements;
3. Through the image forming system and method thereof provided by the present disclosure, a managing server may be configured to integrate and manage a plurality of image forming devices, properly allocate hardware resources, and select and configure a desired image forming device based on user demands, thereby improving the friendly experience by the users; and
4. The receiver provided by the disclosed image forming system may be, for example, an instant messaging client of WeChat, and the user no longer needs to download and install an application software that particularly drives the image forming device for the smart communication device. That is, the user may conveniently fulfill the synchronous transmission of information and configuration of the image forming device by logging into the client, such that the operations become easier and more convenient.

The foregoing is merely some specific embodiments, and the protection scope of the present disclosure is not limited thereto. Anyone skilled in the relevant art shall understand that, without departing from the technical scope of the present disclosure, all modifications and alterations of the present disclosure shall fall within the protection scope of the present disclosure.

What is claimed is:

1. An image forming system for parsing instant messaging information, comprising:
    a receiver, configured to receive instant messaging information;
    a parser, configured to determine a data type of the instant messaging information;
    a processor, configured to process the instant messaging information based on the determined data type of the instant messaging information, and convert the instant messaging information into image information recognizable and printable by an image forming device, the image forming device including an imager; and
    the imager, configured to control the image forming device to print the image information,
    wherein the data type of the instant messaging information, determined by the parser, includes:
        a first data type of the instant messaging information including text and image;
        a second data type of the instant messaging information including website link, wherein the processor includes an embedded browser, and when the data type of the instant messaging information is the second data type, the embedded browser acquires related content corresponding to the website link, the processor converts the related content to the image information recognizable and printable by the image forming device, and the processor sends the image information to the imager; and
        a third data type of the instant messaging information including non-text, non-image, and non-website-link,
    wherein:
        when the data type of the instant messaging information is the first data type, the processor converts the instant messaging information directly into the image information recognizable and printable by the image forming device and sends the image information to the imager.

2. The image forming system according to claim 1, further comprising:
    a safety detector, configured to determine whether a website link is safe.

3. The image forming system according to claim 1, further including:
    one or more image forming devices managed by a managing server, wherein:
    the managing server is configured with the receiver and the parser, and
    each of the one or more image forming devices includes the processor and the imager.

4. The image forming system according to claim 3, wherein:
    the receiver is an instant messaging client for login by a user, and
    through the instant messaging client, the user is able to select and/or configure one of the one or more image forming devices managed by a managing server.

5. The image forming system according to claim 4, wherein:
    the instant messaging client is an instant message application client, and
    the parser determines the data type of information received by the instant message application client based on a Message Type value (MsgType value) in the information received by the instant message application client.

6. The image forming system according to claim 5, wherein:
    the information received by the instant message application client includes information shared through "Moments" of the instant message application, information pushed by a friend, information shared by an instant message application user, or combination thereof.

7. The image forming system according to claim 3, wherein the processor is further configured to prevent malicious printing requests by controlling a printing frequency of an instant message application user, a number of maximum printing pages for each printing, and a white list of instant message application users allowed to print.

8. The image forming system according to claim 3, wherein the processor is further configured to provide feedback to a user regarding information related to a printing task.

9. The image forming system according to claim 1, wherein:
    the image forming device includes a client for starting and logging in an instant messaging software program, and the instant messaging software program supports a logging in method by QR code scanning; and
    a user scans a QR code generated by the image forming device through a smart device, confirms on the smart device a login of an instant messaging account on the image forming device, and the user receives the instant messaging information through the instant messaging account of the user.

10. The image forming system according to claim 1, wherein:
    the image forming device includes a client for starting and logging in an instant messaging software program, and the instant messaging software program supports login by a plurality of users, thereby enabling the plurality of users to simultaneously log in a same image forming device by scanning a QR code and to send data to be printed to the image forming device through a corresponding user's account, respectively.

11. The image forming system according to claim 1, wherein:
    when the data type of the instant messaging information is the second data type, the processor is configured to send a notification to a user for choosing to:
    print the website link, or
    print only the content of the website link.

12. An image forming method for parsing instant messaging information, comprising:

receiving instant messaging information;

determining a data type of the instant messaging information by a parser, wherein the data type of the instant messaging information, determined by the parser, includes:

a first data type of the instant messaging information including text and image;

a second data type of the instant messaging information including website link, wherein when the data type of the instant messaging information is website link, related content corresponding to the website link is acquired and is converted into image information recognizable and printable by an image forming device; and a third data type of the instant messaging information including non-text, non-image, and non-website-link;

based on the determined data type, acquiring content of data or acquiring content of a data link; and based on the content of the acquired data or the content of the acquired data link, printing image information, wherein:

when the data type of the instant messaging information is text, image, or a combination thereof, the instant messaging information is converted into image information recognizable and printable by an image forming device.

13. The image forming method according to claim 12, wherein:

the instant messaging information is information received through an instant message application client, and based on a Message Type value (MsgType value) in data received by the instant message application client, the data type of the data received by the instant message application client is determined.

14. The image forming method according to claim 12, wherein:

a managing server and one or more image forming devices managed by the managing server are configured to print the image information;

the managing server includes a receiver and a parser, wherein the receiver receives the instant messaging information and the parser determines the data type of the instant messaging information; and each of the one or more image forming devices includes a processor and an imager, wherein the processor acquires the content of data or acquires the content of the data link based on the data type of the instant messaging information determined by the parser, and the imager controls the image forming device to print the image information.

15. The image forming method according to claim 14, further comprising:

preventing, by a permission managing element, malicious printing requests, wherein the permission managing element includes a printing frequency configuration module, a printing type configuration module, a printing page number configuration module, and/or user permission configuration module.

16. The image forming method according to claim 12, wherein:

the instant messaging information is sent to an image forming device by starting and logging an instant messaging software program through a client included in the image forming device, wherein:

the instant messaging software program supports a logging in method by QR code scanning such that a user is able to use a smart device to scan a QR code generated by the image forming device and to confirm by the smart device a login of an instant messaging account on the image forming device, and the instant messaging information is received through the instant messaging account.

17. The image forming method according to claim 12, wherein:

the instant messaging information is sent to an image forming device by starting and logging an instant messaging software program through a client included in the image forming device, wherein:

the instant messaging software program supports login by a plurality of users such that the plurality of users are able to simultaneously log in a same image forming device by scanning a QR code, respectively and to send the instant messaging information to the image forming device for printing through a corresponding user's account, respectively.

* * * * *